Jan. 26, 1954  W. CAMPBELL  2,667,139
PIPE COLLAR ALIGNING AND CLAMPING MEANS
Filed Sept. 21, 1950
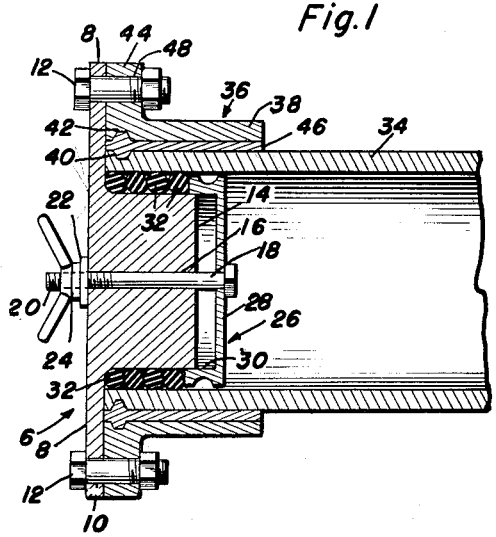
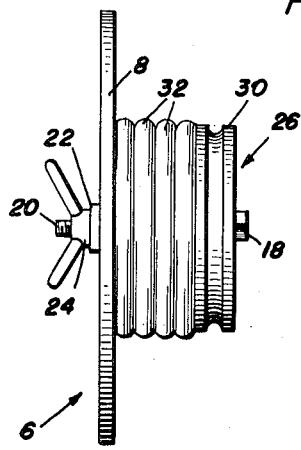
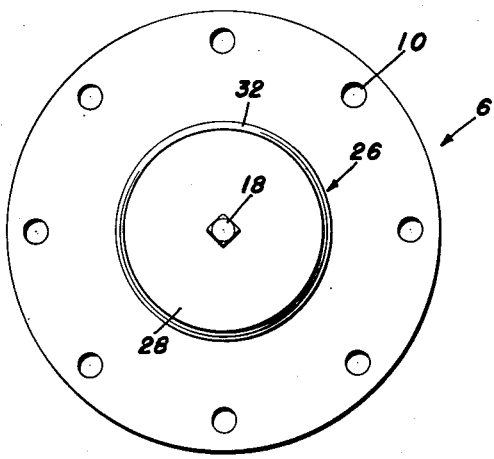
Inventor
Walter Campbell
By *Clarence A. O'Brien and Harvey B. Jacobson*
Attorneys Patented Jan. 26, 1954

2,667,139

UNITED STATES PATENT OFFICE 2,667,139

PIPE COLLAR ALIGNING AND CLAMPING MEANS

Walter Campbell, Raymondville, N. Y.

Application September 21, 1950, Serial No. 185,976

2 Claims. (Cl. 113—102)

The present invention relates to novel and improved ways and means whereby an end portion of a "Transite" or equivalent pipe may be concentrically aligned in spaced relation to the inner diameter of an annular collar and temporarily clamped in this thus centered position in satisfactory preparation for producing what is commonly known as a poured joint.

It is common practice to utilize a bell-shaped collar which has an inside diameter greater than the outside diameter of a pipe, and to obtain a desired jointing bond between the two by pouring a compound of lead or sulphur into the pocket or channel which is defined between the pipe and collar. A joint so formed is commonly known as a "poured joint."

The problem of aligning the pipe end concentrically with respect to the collar and of holding this alignment during the pouring operation has always been difficult of solution. In normal practice, the collar is placed upon a flat surface with the face down and the pipe is inserted into said collar. By holding the pipe on its external surface, an attempt is made to locate and secure the pipe in the desired concentric spaced relation relative to the collar. When working with large diametered pipe in long lengths, the difficulty of this operation is readily apparent. If the end of the pipe is not square with its axis, the pipe tends to tip with respect to the face of the collar and the necessary concentricity is lost. Furthermore, it is not practical to insert wedges between the outside of the pipe and the flange to obtain axial concentricity because any such wedges will seriously interfere with the pouring of the joint.

From the foregoing, it will be understood that the instant disclosure does not involve the aforementioned typical bell-shaped collar. Instead, the collar is actually an annulus whose internal diameter is greater than the external diameter of the pipe on which it is adapted to be mounted and said annulus is provided with a radial endless flange with bolt holes.

In reducing to practice the preferred form of collar attaching supporting and aligning device, a disk is provided and the disk in turn is formed on one side with a central cylindrical protuberance which latter constitutes a plug and is adapted to project axially into the pipe-end and is further adapted to accommodate compressibly resilient pipe-clamping rings and a bolted follower which coacts with the plug and rings to compress and expand the latter to assume clamping positions on the interior of the pipe-end.

Another object of the invention is to structurally, functionally and otherwise improve on known efforts and devices for carrying such methods into effect and, in so doing, to provide structural means in which manufacturers, plumbers and users will find their essential needs fully met, contained and aptly available.

Then, too, novelty is predicated on a simple and practical device which is characterized by a disk with bolt holes for bolting the flanged portion of the collar to the disk, a centered aligning plug and any practical means whereby, when same is placed axially in the pipe-end, the pipe-end will abut the disk and will be clamped to the plug to thus provide a space between the exterior of the pipe-end and the interior of the collar providing a well into which the pouring compound is poured and allowed to harden.

Other objects and advantages will become more readily apparent from the following description and the accompanying illustrative drawings.

In the accompanying sheet of drawings, wherein like numerals are employed to designate like parts throughout the views:

Figure 1 is a fragmentary section of an end portion of a pipe with the aligning and clamping device in position, with the collar in position, and with the "poured joint" completed;

Figure 2 is a side elevational view of the same with the joint about to be poured;

Figure 3 is a side elevational view of the aligning and clamping device; and

Figure 4 is an end view of same, observing it in a direction from right to left.

Referring now to the important unit, the aligning and clamping device, this, as an over-all special adaptation, is denoted by the numeral 6. As before described, this device preferably comprises a disk 8 of proper diameter with bolt holes 10 to accommodate the bolts 12. On one side, the disk has a centered cylindrical projection or protuberance which forms a complemental aligning hub 14. The hub has a central passage forming a bolt hole 16 for the bolt 18. The threaded end 20 of the bolt passes through and beyond the left-hand end of the bolt hole, where it accommodates a washer 22 and a thumb nut or equivalent clamping member 24. The headed end of the bolt serves to accommodate and attach a metal follower and compression member or cap 26. This comprises an apertured disk portion 28 and a marginal annular flange 30 which fits telescopically over and slides on the outer peripheral surface of the hub 14. The flange serves to compress and expand a plurality of rubber assembling and clamping rings 32. The rings surround the hub between the disk 8 and the follower flange 30.

The collar which is to be attached to the end of the pipe 34 is denoted generally by the numeral 36 and comprises a collar proper which may be described as an annulus 38 whose inside diameter is greater than the outside diameter of the pipe-end 34. The pipe-end has a channel 40 and a similar opposed channel 42 is formed in the flanged portion 44 of the collar. The pouring and bonding compound is denoted by the numeral 46. The flange is provided with bolt holes 48 which line up with the bolt holes 10 in the disk 8.

In practice, the important device or means 6 is made ready for use by placing a series of compressible expanding clamping rings 32 over the peripheral portion of the hub 14 as shown, for example, in Figures 1 and 3. The compression cap or follower 26 is brought into position and the flange 30 is telescoped over the hub 14. The headed end of the bolt is passed through the body 28 of the cap and then through the passage 16 in the plug. The washer 22 is put in position and the nut 24 is applied and the device is now set for use as shown in Figure 3. The holes 10 in the disk 8 line up with the holes 48 in the flange 44. By registering these respective holes 10 and 48, the bolts 12 are put through and the collar means, as one unit or device, is now fastened to the aligning and clamping device 6. The collar is, of course, concentric to the plug and rings and follower carried by the plug. An annular space is thus had and the end of the pipe 34 is slipped or telescoped into this space. Or, to put it otherwise, the ring-equipped plug is telescoped into the end of the pipe, making the interior diameter of the collar 38 concentric with the exterior surface or diameter of the pipe-end 34. The pipe end stops flush with the inside face of the disk 8 and the pocket or pouring channel is now concentric and ready. The wing nut is turned on the threads on the bolt, pulling the follower axially into contact with the compression rings. As this operation is continued, the compression rings, being compressible, expand in diameter, concentrically aligning and clamping the pipe-end with respect to the surrounding collar. After placing the joint runner 50 (parts 52 and 54) in position as shown in Figure 2, the joint is ready to be poured. After the joint has been poured, the bonding compound between the collar 38 and pipe-end 34 as shown in Figure 1 sets and hardens, after which the device 6 and its complements may be detached from the flange 44, in an obvious manner.

As shown, the principle involved in the use of this device 6 is that concentric and axial alignment of the collar with respect to the pipe is obtained by independently aligning each part to a secondary or reference member, in this case the flanged alignment plug, thus obtaining the required alignment of the two pieces with respect to one another.

Although Transite pipe is indicated, it is the intent of this invention to include, within its scope, pipes of all materials, such as cast iron, wrought iron, steel, etc.

Although a collar of my invention is indicated, it is the intent of this invention to include collars, flanges, and fittings of other design within its scope.

I claim, therefore, to have evolved a simple and expedient fixture which will accurately align, both axially and concentrically, a pipe with respect to a collar or flange, in preparation for making what is known as a "poured joint."

I further claim to have evolved a fixture which clamps and holds in alignment a pipe with respect to a collar or flange, without in any way interfering with the pouring of the joint.

I wish also to point out a very distinct advantage of my invention in that it will definitely align a pipe with a collar, both axially and concentrically, even though the end of the pipe is not square with its longitudinal axis.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. Means for aligning a pipe and a flanged collar exteriorly encircling said pipe with the collar in concentrically spaced relation with respect to the exterior of the pipe, said means being characterized by a disk of a prescribed diameter, the outer marginal edge portion of said disk being provided with bolt holes, said disk being provided on one side at its center with a plug, said plug being solid and cylindrical in cross-section and provided at its axial center with a bolt hole, the peripheral surface of said plug being smooth and of an outside diameter less than the diameter of the disk, a follower cap opposed to one end of said plug and provided with a peripheral annular flange, said flange telescoping over the adjacent end portion of the plug and being adjustable on said plug, the outside diameter of said flange being adapted to correspond with the diameter of the bore of a pipe, a plurality of independent compressibly resilient packing rings encircling said plug and interposed between the disk and the flange on said follower cap, and a nut equipped bolt passing through the corresponding central portions of the cap and plug respectively, the nut on said bolt being accessibly arranged against the exterior surface of said disk, whereby when the bolt is tightened the annular flange on the cap slides on the plug and compresses the rings between the flange and said disk.

2. The structure defined in claim 1, and the combination therewith of a collar which is adapted to be bonded to an associated pipe with which it is aligned, said collar being of an external diameter greater than the diameter of the plug, and being provided at one end with an outstanding flange, said flange being of an external diameter corresponding to the diameter of said disk, said flange abutting said disk, and bolts passing removably through the flange and bolt holes in said disk.

WALTER CAMPBELL.

References Cited in the file of this patent
UNITED STATES PATENTS

| Number | Name | Date |
|---|---|---|
| 986,297 | Kinkade | Mar. 7, 1911 |
| 1,059,053 | Lennon | Apr. 15, 1913 |
| 1,077,352 | Kemp et al. | Nov. 4, 1913 |
| 1,099,158 | Baker | June 9, 1914 |
| 1,120,697 | Dehn | Dec. 15, 1914 |
| 2,199,749 | Mazurie | May 7, 1940 |
| 2,512,041 | Steele | June 20, 1950 |
| 2,559,210 | Bradley | July 3, 1951 |

FOREIGN PATENTS

| Number | Country | Date |
|---|---|---|
| 527,387 | Great Britain | Oct. 8, 1940 |